Dec. 21, 1965   O. A. BATTISTA   3,224,967
BEARING
Filed Aug. 3, 1962
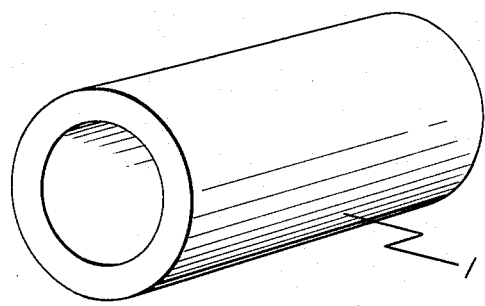

3,224,967
BEARING
Orlando A. Battista, Drexel Hill, Pa., assignor, by mesne assignments, to FMC Corporation, San Jose, Calif., a corporation of Delaware
Filed Aug. 3, 1962, Ser. No. 214,645
8 Claims. (Cl. 252—12)

This application is a continuation-in-part of application Serial No. 836,320 filed Aug. 27, 1959 now abandoned.

This invention relates to bearings. More particularly, this invention relates to bearing elements having a low coefficient of friction comprising cellulose crystallite aggregates.

It is known that cellulose, both natural or regenerated, may be subjected to a hydrolysis action; and the amorphous portion of the cellulose may be removed. The remaining portion of the cellulose has been termed "level-off D.P. cellulose" and described in the paper of Orlando A. Battista and entitled "Hydrolysis and Crystallization of Cellulose" volume 42, "Industrial and Engineering Chemistry" 502–7 (1950). "Level-off D.P. cellulose," as defined, gives a very sharp X-ray diffraction diagram of crystalline cellulose having an unusually high lateral order.

This crystalline cellulose which shall be referred to herein as cellulose crystallite aggregates may be readily recovered in free-flowing powder-like form in which the grains or particles are substantially from 1 to 250 microns in their greatest dimension.

The cellulose crystallite aggregates may at least in part be reduced to an aqueous colloidal dispersion forming size or size distribution by subjecting to attrition, high speed cutting, or high pressure.

The cellulose crystallite aggregates employed in this invention are further described in United States Patent No. 2,978,446 which issued April 4, 1961.

This invention has for its principal object to provide bearing structures comprising cellulosic crystallite aggregates.

Another object of this invention is to provide bearing structures comprising cellulosic crystallite aggregates impregnated with a lubricant.

Other objects and advantages of the invention will be apparent from the following description and the accompanying drawing.

In the drawings:

The sole figure of the drawings shows a perspective view of a general form of a journal type bearing embodying the invention indicated by reference character 1.

In general the bearings that embody this invention comprise a structure of cellulosic crystallite aggregates that has a low coefficient of friction. The cellulosic crystallite aggregates may be either cellulose crystallite aggregates or derivatives thereof which shall be more fully described. Either the stationary or moveable elements of the bearing or both may be of the cellulosic crystallite aggregates. The bearings are of the conventional structure such as ball or roller in which either or both the ball, roller or raceways are of the cellulosic crystallite aggregates or journal bearings or low friction slide blocks. Lubricant may be incorporated into the bearing elements either during or after its formation. Minor amounts of plastic or resin bonding materials may be incorporated to further reinforce the bearing element.

In the bearing structure of one embodiment of this invention, a portion of cellulose crystallite aggregates of which the order of at least 1% by weight are disintegrated to a particle size of less than 1 micron in the greatest dimension either by pressure while wet or dry or by a high speed cutting or shearing action in the presence of a liquid. When pressure is used to disintegrate the cellulose crystallite aggregates, a quantity of the aggregates is subjected in a mold or die to a pressure of the order of 10,000 pounds or greater per square inch—for example 25,000 to 50,000 pounds per square inch and in instances where explosive compacting procedures are used the pressure may be of the order of 1,000,000 pounds per square inch. The pressure disintegrates the aggregates so that of the order of 1% or more are reduced to a particle size of less than 1 micron in their greatest dimension. Due to the small size of the particles and the close proximity in which adjacent particles are associated in the structure that is formed, hydrogen bonding cohesive or attractive forces are set up between the particles which are sufficient to bind the particles together to form a structure having high tensile and compression strengths. The mold or die may be of the shape in which it is desired to form the bearing structure or the compressed cellulose crystallite aggregate structure may be machined to the desired shape by the conventional machine cutting tools.

The particle size and size distribution of the disintegrated cellulosic crystallite aggregates of the bearing structure of this invention are such that when a stable dispersion of these aggregates is formed in an aqueous medium in which the aggregates constitute about 1% by weight of the dispersion, at least 1% of the weight of the dispersed aggregates have a particle size of less than 1 micron in the greatest dimension. When this dispersion is applied to glass and the water allowed to evaporate, it forms an extremely adherent film on the glass.

The cellulose crystallite aggregates may be wet or suspended in water and disintegrated by a high speed cutting or shearing action. The excess water is removed and the wet mass of disintegrated cellulose crystallite aggregates may be dried with or without pressure in a mold. By this procedure, a dense smooth structure is formed having a surface that has low coefficient of friction.

The wet disintegrated cellulose crystallite aggregates may be either dried in the desired form or may be dried in a general structural shape and machined to the desired form.

The lubricant used in this invention may be any suitable lubricant that is used in bearings; and it includes mineral oils, lubricating compositions, animal or vegetable oils such as sperm oil, castor oil or natural or synthetic waxes; or it may be another lubricant such as graphite or a silicone composition.

Hydrocarbon and halogenated hydrocarbon particularly fluorinated hydrocarbon resins having lubricating properties may be used.

The lubricant in the form of a liquid or paste or dissolved in a suitable liquid solvent may be applied to the cellulosic crystallite aggregates either before or while they are being disintegrated or it may be applied to the finished bearing. An amount of lubricant is used that is sufficient to lubricate the friction surfaces of the bearing for a time satisfactory for commercial operation. When the aggregates are disintegrated by pressure or subjected to extreme pressure in a mold an excess of lubricant may be used and the excess that does not impregnate the aggregates is squeezed out and removed. This amount may be from 1 to 70% by weight based on the weight of the aggregates and for most purposes where extreme pressures are employed from 50 to 70% may be used. Where the lubricant is applied to the bearing structure after it is formed, the bearing may be immersed in the lubricant and allowed to absorb or soak up the lubricant and the excess is drained and wiped or removed from the surfaces of the bearing. Where the cellulosic crystallite aggregates are disintegrated in an aqueous liquid and the lubricant is applied either before or during the disintegration and the excess water is removed and the mass of disintegrated aggregates allowed to dry in a mold to a structural shape, usually a smaller amount of lubricant is applied to the aggregates, the amount being less than that which would excessively impare the hydrogen bonding of the aggregate particles together as they are dried. For most purposes under these conditions amounts of lubricant up to 10% and preferably 1 to 5% of the weight of the aggregates may be used. The solid lubricant such as the high molecular weight hydrocarbon resin or halogenated hydrocarbon resin may be incorporated by grinding fine and incorporating in the cellulosic crystallite aggregates by mixing either before or during the disintegration of the aggregates.

Derivatives of cellulose crystallite aggregates which are essentially topochemical derivatives and that possess physical characteristics and properties similar to those of the cellulose crystallite aggregates may also be used in the practice of this invention. These derivatives have about the same D.P. and a size in the same particle size range as the crystallite aggregates from which they have been formed, and the disintegrated derivatives have dispersibility, gel-forming, and bonding together characteristics similar to those of the disintegrated cellulose crystallite aggregates. The degree of substitution (D.S.) of these derivatives is sufficiently low so that the derivatives are water-insoluble and/or organic solvent-insoluble. Chemically, the degree of substitution (D.S.) may be of the order of 0.01 to 0.2. The D.S. has reference to the total degree of substitution which may include both hydrophilic and hydrophobic substituents. The derivatives may be formed from disintegrated cellulose crystallite aggregates and will have a particle size ranging from below 1 micron to about 250 microns depending directly upon the particle size of the aggregates. Alternatively, the derivatives may be formed from non-disintegrated aggregates and subsequently disintegrated. Where the D.S. is sufficiently low so that the derivatives are water-insoluble and/or organic solvent-insoluble, the disintegrated aggregates derivatives have a unique and distinguishing characteristics, like that of the disintegrated crystallite aggregates, in their ability to form stable dispersions in non-solvent liquid media, which media is capable of partially swelling the disintegrated aggregates, providing that the derivatives constitute at least about 1% by weight of the dispersion and at least 1% of the weight of the dispersed aggregates derivatives have a particle size not exceeding about 1 micron. A further characteristic which distinguishes the aggregates derivatives over the conventional cellulose derivatives is their ability to form self-adherent, continuous films when a stable dispersion containing about 1% by weight of the derivatives and at least 1% of the weight of those dispersed derivatives have a particle size of less than one micron in the greatest dimension in a non-solvent liquid media which partially swells the derivatives is applied to a clean surface, such as glass, and the liquid media is allowed to evaporate.

A wide range of derivatives of the cellulose crystallite aggregates are satisfactory and these derivatives are disclosed in copending applications Serial No. 2,133, now Patent No. 3,111,513, dated November 19, 1963, Serial No. 2,134 and Serial No. 2,135 filed January 13, 1960. These derivatives include, for example, oxidation derivatives containing 1 or more carbonyl linkages including aldehyde, carboxyl and mixed aldehyde-carboxyl derivatives; ether derivatives characterized by having one or more —OR groups where R may be an aliphatic or substituted aliphatic radical, either a straight or branched chain containing from 1 to 12 or more carbon atoms, an aryl or aralkyl or substituted aralkyl radical or a carboxylalkyl, hydroxyalkyl, cyanoalkyl, alkoxyalkyl, aralkyloxyalkyl, or a dialkylaminoalkyl radical; and ester derivatives, for example, esters of inorganic acids such as the nitrates, nitrites, thiocyanates and phosphates and esters of organic acids such as the formates, acetates, propionates, butyrates, mixed acetate-propionates, mixed acetate-butyrates, other aliphatic acid derivatives containing up to 18 or more carbon atoms and aryl or aralkyl esters such as, for example, benzoates, phenyl acetate esters, phthalate esters, naphthonates and the like.

For the purposes of the present invention, the cellulose crystallite aggregates and the aggregates derivatives having physical characteristics and properties similar to those of the cellulose crystallite aggregates discussed above are equivalents.

The following examples are illustrative of the invention:

EXAMPLE I 400 grams of free-flowing powder-like air dried cellulose crystallite aggregates was subjected to a pressure of 10,000 pounds per square inch in a mold in the form of a bearing. To the compressed bearing structure 280 grams of a heavy lubricating oil was applied. The excess oil that was not absorbed was removed from the surfaces of the bearing.

EXAMPLE II 400 grams of free-flowing powder-like air dried cellulose crystallite aggregates powder was mixed with 280 grams of heavy lubricating oil. The cellulose crystallite aggregates and the lubricating oil were placed in a mold that was of the form of the desired bearing, and it was subjected to a pressure of 10,000 pounds per square inch. The excess oil was squeezed out and was wiped from the surfaces of the bearing.

Water-insoluble and/or organic solvent-insoluble cellulose crystallite aggregates derivatives having the properties and characteristics described hereinbefore such as for example, carboxy methyl, hydroxy propyl, or acetate derivatives may be substituted for the cellulose crystallite aggregates in the foregoing examples to form bearings which have the same structure and utility as those of the specific examples.

While preferred embodiments of the invention have been shown and described, it is to be understood that changes and variations may be made without departing from the spirit and scope of the invention except as defined by the appended claims.

I claim:

1. A bearing having a load bearing surface with a low coefficient of friction consisting essentially of a substance selected from the group consisting of cellulose crystallite aggregates, water-insoluble and organic solvent-insoluble derivatives of cellulose crystallite aggregates, the aggregates being of a size and size distribution that when a stable dispersion of the aggregates is formed in an aqueous medium, which aggregates constitute about 1% by weight of the dispersion and at least 1% of the weight of the dispersed aggregates have a particle size of up to 1 micron, and the dispersion is applied to glass and the water allowed to evaporate it forms an extremely adherent film on the glass, the aggregates being bonded together in the bearing in a solid mass by the attractive forces between the aggregates.

2. A bearing as defined in claim 1 wherein the load bearing surface consists essentially of cellulose crystallite aggregates.

3. A bearing as defined in claim 1 wherein the load bearing surface consists essentially of a water-insoluble derivative of cellulose crystallite aggregates.

4. A bearing as defined in claim 1 wherein the load bearing surface consists essentially of an organic solvent-insoluble derivative of cellulose crystallite aggregates.

5. A bearing having a load bearing surface with a low coefficient of friction consisting essentially of a substance selected from the group consisting of cellulose crystallite aggregates, water-insoluble and organic solvent-insoluble derivatives of cellulose crystallite aggregates, the aggregates being of a size and size distribution that when a stable dispersion of the aggregates is formed in an aqueous medium, which aggregates constitute about 1% by weight of the dispersion and at least 1% of the weight of the dispersed aggregates have a particle size of up to 1 micron, and the dispersion is applied to glass and the water allowed to evaporate it forms an extremely adherent film on the glass, the aggregates being bonded together in the bearing in a solid mass by the attractive forces between the aggregates, and the bearing containing from 1% to 70% by weight, based on the weight of the aggregates, of a lubricant distributed therein, the lubricant being selected from the group consisting of liquid lubricants and solid lubricants.

6. A bearing as defined in claim 5 wherein the load bearing surface consists essentially of cellulose crystallite aggregates.

7. A bearing as defined in claim 5 wherein the load bearing surface consists essentially of a water-insoluble derivative of cellulose crystallite aggregates.

8. A bearing as defined in claim 5 wherein the load bearing surface consists essentially of organic solvent-insoluble derivatives of cellulose crystallite aggregates.

References Cited by the Examiner

UNITED STATES PATENTS

| | | | |
|---|---|---|---|
| 835,298 | 11/1906 | Bell | 18—55 |
| 1,076,941 | 10/1913 | Bache | 252—12.2 |
| 1,827,737 | 10/1931 | Coolidge | 252—12.2 |
| 2,978,446 | 4/1961 | Battista et al. | 260—212 |

DANIEL E. WYMAN, *Primary Examiner.*

J. R. LIBERMAN, *Examiner.*